US012793978B2

(12) United States Patent
Kim et al.

(10) Patent No.: US 12,793,978 B2
(45) Date of Patent: Nov. 10, 2026

(54) POSITIVE ELECTRODE ACTIVE MATERIAL AND METHOD OF PREPARING THE SAME

(71) Applicant: LG Chem, Ltd., Seoul (KR)

(72) Inventors: Na Ri Kim, Daejeon (KR); Sang Soon Choi, Daejeon (KR); Dong Ryoung Kang, Daejeon (KR); Woo Ram Lee, Daejeon (KR); Hyun Ah Park, Daejeon (KR); Byeong Guk Kwon, Daejeon (KR); Jae Geun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 355 days.

(21) Appl. No.: 18/288,294

(22) PCT Filed: May 11, 2022

(86) PCT No.: PCT/KR2022/006725
§ 371 (c)(1),
(2) Date: Oct. 25, 2023

(87) PCT Pub. No.: WO2022/240176
PCT Pub. Date: Nov. 17, 2022

(65) Prior Publication Data

US 2024/0243273 A1 Jul. 18, 2024

(30) Foreign Application Priority Data

May 11, 2021 (KR) ........................ 10-2021-0061000

(51) Int. Cl.

| | |
|---|---|
| ***H01M 4/525*** | (2010.01) |
| ***C01G 53/50*** | (2025.01) |
| ***H01M 4/131*** | (2010.01) |
| ***H01M 4/36*** | (2006.01) |
| ***H01M 4/38*** | (2006.01) |
| ***H01M 4/587*** | (2010.01) |
| ***H01M 10/052*** | (2010.01) |
| *H01M 4/02* | (2006.01) |

(52) U.S. Cl.
CPC ............ *H01M 4/525* (2013.01); *C01G 53/50* (2013.01); *H01M 4/131* (2013.01); *H01M 4/366* (2013.01); *H01M 4/38* (2013.01); *H01M 4/587* (2013.01); *H01M 10/052* (2013.01); *C01P 2002/50* (2013.01); *C01P 2002/76* (2013.01); *C01P 2004/84* (2013.01); *C01P 2006/40* (2013.01); *H01M 2004/028* (2013.01)

(58) Field of Classification Search
CPC ............. H01M 2004/028; C01G 53/50; C01G 53/82; Y02E 60/10
See application file for complete search history.

(56) References Cited

U.S. PATENT DOCUMENTS

| | | | |
|---|---|---|---|
| 2009/0068561 | A1 | 3/2009 | Sun et al. |
| 2013/0202966 | A1 | 8/2013 | Yu et al. |
| 2015/0010824 | A1 | 1/2015 | Sun et al. |
| 2016/0211517 | A1 | 7/2016 | Beck et al. |
| 2018/0013145 | A1 | 1/2018 | Choi et al. |
| 2018/0331358 | A1 | 11/2018 | Yamaji et al. |
| 2019/0103603 | A1 | 4/2019 | Kawakami et al. |
| 2020/0161643 | A1 | 5/2020 | Chang et al. |
| 2021/0234155 | A1 | 7/2021 | Jeong et al. |
| 2023/0317939 | A1 | 10/2023 | Ahn et al. |

FOREIGN PATENT DOCUMENTS

| | | | |
|---|---|---|---|
| CN | 102751470 | A | 10/2012 |
| CN | 107210419 | A | 9/2017 |
| CN | 107240712 | A | 10/2017 |
| CN | 108793268 | A | 11/2018 |
| CN | 110540254 | A | 12/2019 |
| CN | 112005411 | A | 11/2020 |
| JP | 2009525578 | A | 7/2009 |
| JP | 2017091821 | A | 5/2017 |
| JP | 2019067620 | A | 4/2019 |
| JP | 2021034142 | A | 3/2021 |

(Continued)

OTHER PUBLICATIONS

Extended European Search Report including Written Opinion for Application No. 22807823.4 dated Sep. 16, 2024, 8 pages.

Wu, K. et al., "A novel synthesis strategy to improve cycle stability of LiNio.sMno.I Coo. I 02 at high cut-off voltages through core-shell structuring" Nano Research, Springer, Jun. 2019, pp. 2460-2467, vol. 12, No. 10.

Song, L. et al., "Core-shell structure LiNi0.8Co0.1Mn0.102 cathode material with improved electrochemical performance at high voltage" Original Paper, Springer, Jan. 2021. pp. 949-959, vol. 27.

Liu, Y, et al., "Cobalt-Free Core-Shell Structure with High Specific Capacity and Long Cycle Life as an Alternative to Li[Ni0.8Mn0.1Co0.1]02" Open Access, ECS the Electrochemical Society, Sep. 2020, pp. 1-9, vol. 167.

(Continued)

*Primary Examiner* — Khanh T Nguyen
(74) *Attorney, Agent, or Firm* — Lerner David LLP

(57) ABSTRACT

A positive electrode active material and method of preparing the same are disclosed herein. The positive electrode active material can have high capacity and high rate capability. In some embodiments, a positive electrode active material includes lithium transition metal oxide particles having a lithium transition metal oxide represented by Formula 1, wherein an interplanar spacing of (003) crystal planes ((003) d-spacing) of the lithium transition metal oxide of a surface of the particles is larger than a (003) d-spacing of the lithium transition metal oxide inside the particles:

[Formula 1]

$$Li_a[Ni_xCo_yMn_zM^1_w]O_2$$

wherein $0.8 \leq a \leq 1.2$, $0.6 \leq x < 1$, $0 < y < 0.4$, $0 < z < 0.4$, and $0 \leq w \leq 0.1$, and $M^1$ is at least one selected from the group consisting of Al, Zr, B, W, Mg, Ce, Hf, Ta, La, Ti, Sr, Ba, F, P, and S.

9 Claims, No Drawings

(56) References Cited

FOREIGN PATENT DOCUMENTS

| | | | | | |
|---|---|---|---|---|---|
| JP | 2023540364 A | | 9/2023 | | |
| KR | 20110083383 A | | 7/2011 | | |
| KR | 20180006837 A | | 1/2018 | | |
| KR | 20180015046 A | * | 2/2018 | ............ | C01G 53/00 |
| KR | 101875868 B1 | | 7/2018 | | |
| KR | 20190082040 A | | 7/2019 | | |
| KR | 20200055674 A | | 5/2020 | | |
| KR | 20200056953 A | | 5/2020 | | |
| KR | 20200090661 A | | 7/2020 | | |
| KR | 20220057209 A | | 5/2022 | | |
| WO | 2022092488 A1 | | 5/2022 | | |

OTHER PUBLICATIONS

Zhou, F. et al., "Coprecipitation Synthesis of NixMn1-x(OHh Mixed Hydroxides" Chemistry of Materials, ACS Publications, Nov. 2009, pp. 1015-1021, vol. 22.

Tian, R. et al.,"Influences of surface Al concentration on the structure and electrochemical performance of core-shell LiNi0.8Co0.15AI0.0502 cathode material" Elsevier Ltd, Jan. 2020, pp. 1-12.

International Search Report for Application No. PCT/KR2022/006725 mailed Aug. 18, 2022. 3 pages.

* cited by examiner

POSITIVE ELECTRODE ACTIVE MATERIAL AND METHOD OF PREPARING THE SAME

CROSS-REFERENCE TO RELATED APPLICATIONS

This application is a national phase entry under 35 U.S.C. § 371 of International Application No. PCT/KR2022/006725, filed on May 11, 2022, which claims priority from Korean Patent Application No. 10-2021-0061000, filed on May 11, 2021, the disclosure of which is incorporated by reference herein.

TECHNICAL FIELD

The present disclosure relates to a positive electrode active material and a method of preparing the same, and more particularly, to a high-capacity positive electrode active material having high rate capability to enable rapid charging and a method of preparing the same.

BACKGROUND ART

Demand for secondary batteries as an energy source has been significantly increased as demand with respect to mobile devices and electric vehicles have increased, and, among these secondary batteries, lithium secondary batteries having high energy density and low self-discharging rate have been commercialized and widely used. Particularly, demand for high-capacity secondary batteries is increasing as an electric vehicle market is rapidly expanding in recent years, and there is a need to develop a lithium secondary battery having excellent high rate capability to enable rapid charging.

In order to improve capacity characteristics of the secondary battery, lithium composite transition metal oxides including two or more types of transition metals, such as NCM and NCMA, have been developed and used as a positive electrode active material. Conventionally, after an aqueous transition metal solution was prepared by dissolving transition metal raw materials, such as nickel sulfate, cobalt sulfate, and manganese sulfate, in water, the transition metal aqueous solution, a cationic complexing agent, and a basic compound were put into a reactor to perform a co-precipitation reaction to prepare a transition metal precursor in the form of a hydroxide, and it was common to prepare the lithium composite transition metal oxide by mixing the transition metal precursor and a lithium raw material and then sintering the mixture. However, it was difficult to achieve sufficient capacity characteristics and high rate capability with the conventional lithium composite transition metal oxide prepared by the above-described method.

Thus, there is a need to develop a positive electrode active material having high capacity and high rate capability.

Technical Problem

An aspect of the present disclosure provides a positive electrode active material, in which, since a (003) d-spacing of a surface of the positive electrode active material is formed to be larger than a (003) d-spacing inside the positive electrode active material, capacity is high and the high capacity may be maintained even during high-rate charge and discharge, and a method of preparing the positive electrode active material.

Technical Solution

According to an aspect of the present disclosure, there is provided a positive electrode active material including lithium transition metal oxide particles having a lithium transition metal oxide represented by Formula 1, wherein an interplanar spacing of (003) crystal planes ((003) d-spacing) of the lithium transition metal oxide of a surface of the lithium transition metal oxide particle is larger than a (003) d-spacing of the lithium transition metal oxide inside the particle.

[Formula 1]

$$Li_a[Ni_xCo_yMn_zM^1_w]O_2$$

wherein, in Formula 1, $0.8 \le a \le 1.2$, $0.6 \le x < 1$, $0 < y < 0.4$, $0 < z < 0.4$, and $0 \le w \le 0.1$, and $M^1$ is at least one selected from the group consisting of Al, Zr, B, W, Mg, Ce, Hf, Ta, La, Ti, Sr, Ba, F, P, and S.

According to another aspect of the present disclosure, there is provided a method of preparing a positive electrode active material which includes: preparing a multilayer-structured precursor for a positive electrode active material in which two or more elements among nickel, cobalt, and manganese are precipitated in different regions; and preparing a lithium transition metal oxide by mixing the precursor for a positive electrode active material with a lithium raw material and sintering the mixture.

According to another aspect of the present disclosure, there is provided a positive electrode including the positive electrode active material according to the present disclosure and a lithium secondary battery including the positive electrode.

Advantageous Effects

With respect to a method of preparing a positive electrode active material according to the present disclosure, nickel, cobalt, and manganese elements are not co-precipitated at the same time during preparation of a precursor for a positive electrode active material, but two or more elements among nickel, cobalt, and manganese are separately added to prepare a multilayer-structured precursor for a positive electrode active material in which two or more elements among nickel, cobalt, and manganese are precipitated in different regions, and the precursor for a positive electrode active material is mixed with a lithium raw material and then sintered to prepare a positive electrode active material.

In the positive electrode active material of the present disclosure prepared by the above-described method, a (003) d-spacing of a surface of a lithium transition metal oxide particle is formed to be larger than a (003) d-spacing inside the particle. If the (003) d-spacing of the surface of the lithium transition metal oxide is increased, a moving path of lithium ions is increased to facilitate intercalation and deintercalation of the lithium ions. Thus, the positive electrode active material of the present disclosure has better capacity characteristics and high rate capability than a conventional positive electrode active material having a constant (003) d-spacing throughout a particle. Therefore, in a case in which the positive electrode active material of the present disclosure is used in a lithium secondary battery, excellent capacity characteristics and rapid charging performance may be achieved.

DETAILED DESCRIPTION

Hereinafter, the present disclosure will be described in detail.

As a result of a significant amount of research conducted into developing a positive electrode active material with less capacity degradation even during rapid charging, the present inventors have found that a positive electrode active material, in which a (003) d-spacing of a surface of a lithium transition metal oxide particle is relatively larger than a (003) d-spacing inside the lithium transition metal oxide particle, may be prepared by a method in which nickel, cobalt, and manganese elements are not co-precipitated at the same time during preparation of a precursor for a positive electrode active material, but two or more elements among nickel, cobalt, and manganese are separately precipitated, and, in a case in which the above positive electrode active material is used in a lithium secondary battery, high capacity may be maintained even at a high charge and discharge rate, thereby leading to the completion of the present disclosure.

Method of Preparing Positive Electrode Active Material

First, a method of preparing a positive electrode active material of the present disclosure will be described.

The method of preparing a positive electrode active material according to the present disclosure includes the step of: (1) preparing a multilayer-structured precursor for a positive electrode active material in which two or more elements among nickel, cobalt, and manganese are precipitated in different regions, and (2) preparing a lithium transition metal oxide by mixing the precursor for a positive electrode active material with a lithium raw material and sintering the mixture.

(1) Preparing of Precursor for Positive Electrode Active Material

First, a multilayer-structured precursor for a positive electrode active material, in which two or more elements among nickel, cobalt, and manganese are precipitated in different regions, is prepared.

Conventionally, in order to prepare a precursor for a positive electrode active material which includes nickel, cobalt, and manganese, a method was used in which a nickel-containing raw material, a cobalt-containing raw material, and a manganese-containing raw material were mixed together to prepare a composite transition metal solution containing nickel, cobalt and manganese, the composite transition metal solution, an ammonium cationic complexing agent, and a basic compound were added to a reactor, and a co-precipitation reaction was performed. If the conventional method as described above is used, a nickel-cobalt-manganese hydroxide, in which nickel, cobalt, and manganese are distributed in a uniform composition throughout a precursor particle, is prepared.

In contrast, the present disclosure is characterized in that two or more elements among nickel, cobalt, and manganese are included in different separate solutions, and a precursor for a positive electrode active material is prepared by changing their time of addition to the reactor. According to the method of the present disclosure, a multilayer-structured precursor for a positive electrode active material, in which two or more elements among nickel, cobalt, and manganese are precipitated in different regions, is prepared, and, if the multilayer-structured precursor as described above is used, a positive electrode active material, in which (003) d-spacing values of a surface of and inside the particle are different, may be prepared.

Specifically, the multilayer-structured precursor for a positive electrode active material, in which two or more elements among nickel, cobalt, and manganese are precipitated in different regions, may be prepared by any one of the following methods (I) to (III).

Method (I):

First, a nickel-cobalt metal solution, an ammonium cationic complexing agent, and a basic compound are mixed and a co-precipitation reaction is then performed to form nickel-cobalt hydroxide particles.

In this case, the co-precipitation reaction, for example, may be performed in such a manner that, after the reaction is performed for a certain period of time under a condition that a pH of a reaction solution is in a range of 11.5 to 12.5, preferably, 11.8 to 12.3 to form nuclei of hydroxide particles, the pH of the reaction solution is decreased, and an additional reaction is performed to grow the hydroxide particles.

The nickel-cobalt metal solution may be prepared by dissolving a nickel raw material and a cobalt raw material in a solvent such as water.

In this case, the nickel raw material may be acetic acid salts, carbonates, nitrates, sulfates, halides, sulfides, or oxides of nickel, and may specifically be NiO, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a nickel halide, or a combination thereof, but the present disclosure is not limited thereto.

The cobalt raw material may be acetic acid salts, carbonates, nitrates, sulfates, halides, sulfides, or oxides of cobalt metal, and may specifically be $CoSO_4$, $Co(OCOCH_3)_2 \cdot 4H_2O$, $Co(NO_3)_2 \cdot 6H_2O$, $Co(SO_4)_2 \cdot 7H_2O$, or a combination thereof, but the present disclosure is not limited thereto.

The nickel-cobalt metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent may be at least one selected from the group consisting of $NH_4OH$, $(NH_4)_2SO_4$, $NH_4NO_3$, $NH_4Cl$, $CH_3COONH_4$, and $(NH_4)_2CO_3$, and may be added into the reactor in the form of a solution in which the above compound is dissolved in a solvent. In this case, water or a mixture of water and an organic solvent (specifically, alcohol etc.), which may be uniformly mixed with the water, may be used as the solvent.

Also, the basic compound may be at least one selected from the group consisting of NaOH, KOH, and $Ca(OH)_2$, and may be added into the reactor in the form of a solution in which the above compound is dissolved in a solvent. In this case, water or a mixture of water and an organic solvent (specifically, alcohol etc.), which may be uniformly mixed with the water, may be used as the solvent.

If nickel and cobalt are co-precipitated as described above, nickel-cobalt hydroxide particles having a constant concentration of nickel and cobalt throughout the particle are obtained.

Next, the addition of the nickel-cobalt metal solution is stopped, and a precipitation reaction is performed while adding a manganese metal solution, an ammonium cationic complexing agent, and a basic compound to a reaction solution containing the nickel-cobalt hydroxide particles.

In this case, the manganese precipitation reaction, for example, may be performed under a condition that a pH of the reaction solution is in a range of 11.0 or less, preferably, 10.0 to 11.0. When the pH of the reaction solution satisfies the above range, precipitation of manganese is smoothly performed.

The manganese metal solution may be prepared by dissolving a manganese raw material in a solvent such as water. The manganese raw material may be acetic acid salts, carbonates, nitrates, sulfates, halides, sulfides, or oxides of manganese metal, and may specifically be $Mn_2O_3$, $MnO_2$, $Mn_3O_4$, $MnCO_3$, $Mn(NO_3)_2$, $MnSO_4 \cdot H_2O$, manganese acetate, manganese halide, or a combination thereof, but the present disclosure is not limited thereto.

The manganese metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent and the basic compound are the same as described above.

A manganese hydroxide may be precipitated on surfaces of the hydroxide particles, in which nickel and cobalt are co-precipitated, by the precipitation reaction to form a two-layer-structured precursor for a positive electrode active material in which the manganese hydroxide is precipitated on the nickel-cobalt hydroxide.

Method (II):

First, a precipitation reaction is performed while adding a nickel metal solution, an ammonium cationic complexing agent, and a basic compound to form a nickel hydroxide.

In this case, the precipitation reaction of nickel may be performed under a condition that a pH of a reaction solution is in a range of 11.4 to 11.8. When the pH of the reaction solution satisfies the above range, precipitation of nickel may be smoothly performed.

The nickel metal solution may be prepared by dissolving a nickel raw material in a solvent such as water. The nickel raw material may be acetic acid salts, carbonates, nitrates, sulfates, halides, sulfides, or oxides of nickel, and may specifically be NiO, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, nickel halide, or a combination thereof, but the present disclosure is not limited thereto.

The nickel metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent and the basic compound are the same as described above.

Next, the addition of the nickel metal solution is stopped, and a precipitation reaction is performed while adding a cobalt metal solution, an ammonium cationic complexing agent, and a basic compound to a reaction solution, in which the nickel hydroxide has been formed, to form nickel-cobalt hydroxide particles in which a cobalt hydroxide is precipitated on the nickel hydroxide.

The cobalt precipitation reaction may be performed under a condition that a pH of the reaction solution is in a range of 11.0 to 11.4. When the pH of the reaction solution satisfies the above range, precipitation of cobalt may be smoothly performed.

The cobalt metal solution may be prepared by dissolving a cobalt raw material in a solvent such as water. The cobalt raw material may be acetic acid salts, carbonates, nitrates, sulfates, halides, sulfides, or oxides of cobalt metal, and may specifically be $CoSO_4$, $Co(OCOCH_3)_2 \cdot 4H_2O$, $Co(NO_3)_2 \cdot 6H_2O$, $Co(SO_4)_2 \cdot 7H_2O$, or a combination thereof, but the present disclosure is not limited thereto.

The cobalt metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent and the basic compound are the same as described above.

Next, the addition of the cobalt metal solution is stopped, and a precipitation reaction is performed while adding a manganese metal solution, an ammonium cationic complexing agent, and a basic compound to a reaction solution containing the nickel-cobalt hydroxide.

In this case, the manganese precipitation reaction, for example, may be performed under a condition that a pH of the reaction solution is in a range of 11.0 or less, preferably, 10.0 to 11.0. When the pH of the reaction solution satisfies the above range, precipitation of manganese is smoothly performed.

The manganese metal solution may be prepared by dissolving a manganese raw material in a solvent such as water. The manganese raw material may be acetic acid salts, carbonates, nitrates, sulfates, halides, sulfides, or oxides of manganese metal, and may specifically be $Mn_2O_3$, $MnO_2$, $Mn_3O_4$, $MnCO_3$, $Mn(NO_3)_2$, $MnSO_4 \cdot H_2O$, manganese acetate, manganese halide, or a combination thereof, but the present disclosure is not limited thereto.

The manganese metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent and the basic compound are the same as described above.

A three-layer-structured nickel-cobalt-manganese hydroxide, in which the nickel hydroxide, the cobalt hydroxide, and a manganese hydroxide are sequentially precipitated, may be prepared through the above-described method.

Method (III):

First, a precipitation reaction is performed while adding a nickel metal solution, an ammonium cationic complexing agent, and a basic compound to form a nickel hydroxide.

In this case, the precipitation reaction of nickel may be performed under a condition that a pH of a reaction solution is in a range of 11.4 to 11.8. When the pH of the reaction solution satisfies the above range, precipitation of nickel may be smoothly performed.

The nickel metal solution may be prepared by dissolving a nickel raw material in a solvent such as water. The nickel raw material may be acetic acid salts, carbonates, nitrates, sulfates, halides, sulfides, or oxides of nickel, and may specifically be NiO, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, nickel halide, or a combination thereof, but the present disclosure is not limited thereto.

The nickel metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent and the basic compound are the same as described above.

Next, the addition of the nickel metal solution is stopped, and a precipitation reaction is performed while adding a manganese metal solution, an ammonium cationic complexing agent, and a basic compound to a reaction solution, in which the nickel hydroxide has been formed, to form a nickel-manganese hydroxide in which a manganese hydroxide is precipitated on the nickel hydroxide.

In this case, the manganese precipitation reaction, for example, may be performed under a condition that a pH of the reaction solution is in a range of 11.0 or less, preferably, 10.0 to 11.0. When the pH of the reaction solution satisfies the above range, precipitation of manganese is smoothly performed.

The manganese metal solution may be prepared by dissolving a manganese raw material in a solvent such as water. The manganese raw material may be acetic acid salts, carbonates, nitrates, sulfates, halides, sulfides, or oxides of manganese metal, and may specifically be $Mn_2O_3$, $MnO_2$, $Mn_3O_4$, $MnCO_3$, $Mn(NO_3)_2$, $MnSO_4 \cdot H_2O$, manganese acetate, manganese halide, or a combination thereof, but the present disclosure is not limited thereto.

The manganese metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent and the basic compound are the same as described above.

Next, the addition of the manganese metal solution is stopped, and a precipitation reaction is performed while adding a cobalt metal solution, an ammonium cationic complexing agent, and a basic compound to a reaction solution containing the nickel-manganese hydroxide.

The cobalt precipitation reaction may be performed under a condition that a pH of the reaction solution is in a range of 11.0 to 11.4. When the pH of the reaction solution satisfies the above range, precipitation of cobalt may be smoothly performed.

The cobalt metal solution may be prepared by dissolving a cobalt raw material in a solvent such as water. The cobalt raw material may be acetic acid salts, carbonates, nitrates, sulfates, halides, sulfides, or oxides of cobalt metal, and may specifically be $CoSO_4$, $Co(OCOCH_3)_2 \cdot 4H_2O$, $Co(NO_3)_2 \cdot 6H_2O$, $CO(SO_4)_2 \cdot 7H_2O$, or a combination thereof, but the present disclosure is not limited thereto.

The cobalt metal solution may further include an $M^1$-containing raw material, if necessary. In this case, $M^1$ is at least one selected from the group consisting of Al, Zr, B, W, Mg, Ce, Hf, Ta, La, Ti, Sr, Ba, F, P, and S, and the $M^1$-containing raw material may be acetic acid salts, carbonates, nitrates, sulfates, halides, sulfides, or oxides of $M^1$ metal.

The ammonium cationic complexing agent and the basic compound are the same as described above.

A multilayer-structured precursor, in which at least two metallic elements among nickel, cobalt, and manganese are precipitated in different regions, may be prepared through the method (I), (II) or (III). If the precursor particles grow to a desired particle diameter, the reaction is ended, and the precursor for a positive electrode active material is separated from the reaction solution, and then washed and dried to obtain a precursor for a positive electrode active material.

(2) Preparing of Lithium Transition Metal Oxide

Next, the precursor for a positive electrode active material prepared by the above-described method is mixed with a lithium raw material and then sintered to prepare a lithium transition metal oxide.

The lithium raw material, for example, may include lithium-containing carbonates (e.g., lithium carbonate, etc.), hydrates (e.g., lithium hydroxide hydrate ($LiOH \cdot H_2O$), etc.), hydroxides (e.g., lithium hydroxide, etc.), nitrates (e.g., lithium nitrate ($LiNO_3$), etc.), and chlorides (e.g., lithium chloride (LiCl), etc.), and any one thereof or a mixture of two or more thereof may be used.

The mixing of the precursor for a positive electrode active material and the lithium raw material may be performed by solid-phase mixing, and a mixing ratio of the precursor for a positive electrode active material to the lithium raw material may be determined in a range that satisfies an atomic fraction of each component in the finally prepared positive electrode active material. For example, the precursor for a positive electrode active material and the lithium raw material may be mixed in amounts such that a molar ratio of transition metal:lithium (Li) is in a range of 1:0.8 to 1:1.2, preferably 1:0.85 to 1:1.15, and more preferably 1:0.9 to 1:1.1. In a case in which the precursor and the lithium raw material are mixed within the above range, a positive electrode active material exhibiting excellent capacity characteristics may be prepared.

Also, if necessary, a doping element $M^1$-containing material may be further mixed during the sintering. The doping element $M^1$, for example, may be at least one selected from the group consisting of Al, Zr, B, W, Mg, Ce, Hf, Ta, La, Ti, Sr, Ba, F, P, and S, and the doping element $M^1$-containing raw material may be at least one selected from the group consisting of doping element $M^1$-containing acetic acid salts, sulfates, sulfides, hydroxides, oxides, or oxyhydroxides.

The sintering may be performed at 600° C. to 1,000° C., for example, at 700° C. to 900° C., and sintering time may be in a range of 5 hours to 30 hours, for example, 8 hours to 15 hours, but the present disclosure is not limited thereto.

Positive Electrode Active Material

Next, a positive electrode active material according to the present disclosure will be described.

The positive electrode active material according to the present disclosure includes lithium transition metal oxide particles in which a (003) d-spacing of lithium transition metal oxide of a surface of the particle is larger than a (003) d-spacing of lithium transition metal oxide inside the particle. In this case, the expression "inside the particle" means a region at a distance of more than 500 nm from the surface of the positive electrode active material particle, and the expression "surface of the particle" means a region within a distance of 500 nm from the surface of the positive electrode active material particle.

The lithium transition metal oxide particles, for example, may have a composition represented by Formula 1 below.

$$Li_a[Ni_xCo_yMn_zM^1_w]O_2 \quad \text{[Formula 1]}$$

$M^1$ is at least one selected from the group consisting of Al, Zr, B, W, Mg, Ce, Hf, Ta, La, Ti, Sr, Ba, F, P, and S, and may preferably be at least one selected from the group consisting of Al, Zr, B, and W. In a case in which the $M^1$ element is additionally included, an effect of improving capacity characteristics and life characteristics of the positive electrode active material may be obtained.

a represents a molar ratio of lithium in the lithium transition metal oxide, wherein a may satisfy $0.8 \leq a \leq 1.2$, $0.85 \le a \le 1.15$, or $0.9 \le a \le 1.1$. When the molar ratio of the lithium in the lithium transition metal oxide satisfies the above range, since a layered crystal structure may be well developed, a positive electrode active material with excellent electrochemical properties may be obtained.

x represents a molar ratio of nickel among metallic components excluding lithium in the lithium transition metal oxide, wherein x may satisfy $0.6 \le x < 1$, $0.8 \le x \le 1$, or $0.85 \le x < 1$. When the molar ratio of the nickel satisfies the above range, high-capacity characteristics may be achieved.

y represents a molar ratio of cobalt among the metallic components excluding lithium in the lithium transition metal oxide, wherein y may satisfy $0 < y < 0.4$, $0 < y < 0.2$, or $0 < y \le 0.15$.

z represents a molar ratio of manganese among the metallic components excluding lithium in the lithium transition metal oxide, wherein z may satisfy $0 < z < 0.4$, $0 < z < 0.2$, or $0 < z < 0.15$.

w represents a molar ratio of element $M^1$ among the metallic components excluding lithium in the lithium transition metal oxide, wherein w may satisfy $0 \le w \le 0.1$, $0 \le w \le 0.05$, or $0 \le w \le 0.02$.

In the lithium transition metal oxide, the (003) d-spacing (interplanar spacing of (003) crystal planes) of the surface of the particle is larger than the (003) d-spacing (interplanar spacing of (003) crystal planes) inside the particle. If the (003) interplanar spacing of the surface of the particle is increased, a thickness of a Li layer is increased, and, as a result, lithium mobility is improved.

A difference between the (003) d-spacing of the surface of the lithium transition metal oxide particle and the (003) d-spacing inside the particle may be 0.005 nm or more, preferably 0.005 nm to 0.02 nm, and more preferably 0.005 nm to 0.015 nm. When the difference between the (003) d-spacings of the surface of the particle and inside the particle satisfies the above range, an effect of improving capacity characteristics and high rate capability is excellent.

Specifically, the (003) d-spacing of the surface of the lithium transition metal oxide particle may be in a range of 0.46 nm to 0.50 nm, preferably 0.465 nm to 0.50 nm, and more preferably 0.465 nm to 0.490 nm.

Also, the (003) d-spacing inside the lithium transition metal oxide particle may be in a range of 0.45 nm to 0.50 nm, preferably 0.45 nm to 0.49 nm, and more preferably 0.46 nm to 0.485 nm.

Positive Electrode

Next, a positive electrode according to the present disclosure will be described.

The positive electrode according to the present disclosure includes the above-described positive electrode active material according to the present disclosure. Specifically, the positive electrode includes a positive electrode collector and a positive electrode active material layer formed on the positive electrode collector, wherein the positive electrode active material layer includes a positive electrode active material according to the present disclosure.

Since the positive electrode active material has been described above, detailed descriptions thereof will be omitted, and the remaining configurations will be only described in detail below.

The positive electrode collector may include a metal having high conductivity, and is not particularly limited as long as it has no reactivity in a voltage range of the battery and the positive electrode active material layer is easily adhered thereto. As the positive electrode collector, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may optionally include a conductive agent and a binder in addition to the positive electrode active material, if necessary.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive tubes such as carbon nanotubes; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 0.1 wt % to 15 wt % based on the total weight of the positive electrode active material layer.

The binder improves the adhesion between positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, polymethylmethacrylate, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, poly acrylic acid, and a polymer having hydrogen thereof substituted with lithium (Li), sodium (Na), or calcium (Ca), or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a positive electrode material mixture, which is prepared by dissolving or dispersing the positive electrode active material as well as optionally the binder and the conductive agent in a solvent, is coated on the positive electrode collector, and the positive electrode may then be prepared by drying and rolling the coated positive electrode collector, or the positive electrode may be prepared by casting the positive electrode material mixture on a separate support and then laminating a film separated from the support on the positive electrode collector.

The solvent may be a solvent normally used in the art, and may include dimethyl sulfoxide (DMSO), isopropyl alcohol, N-methylpyrrolidone (NMP), dimethyl formamide (DMF), acetone, or water, and any one thereof or a mixture of two or more thereof may be used. An amount of the solvent used may be sufficient if the solvent may dissolve or disperse the positive electrode active material, the conductive agent, the binder, and the dispersant in consideration of a coating thickness of a slurry and manufacturing yield, and may allow to have a viscosity that may provide excellent thickness uniformity during the subsequent coating for the preparation of the positive electrode.

Lithium Secondary Battery

Next, a lithium secondary battery according to the present disclosure will be described.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further optionally include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer optionally includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_β$ ($0<β<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. The negative electrode active material may be included in an amount of 80 wt % to 99 wt % based on a total weight of the negative electrode active material layer.

The binder is a component that assists in the binding between the conductive agent, the active material, and the current collector, wherein the binder may typically be added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber, a nitrile-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The negative electrode active material layer may be prepared by coating a negative electrode material mixture, which is prepared by dissolving or dispersing optionally the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present disclosure is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond, and aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used.

The lithium salt may be used without particular limitation as long as it is a compound capable of providing lithium ions used in the lithium secondary battery. Specifically, an anion of the lithium salt may be at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 4.0 M. If the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above electrolyte components. In this case, the additive may be included in an amount of 0.1 wt % to 5 wt % based on a total weight of the electrolyte.

As described above, since the lithium secondary battery including the positive electrode active material according to the present disclosure stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Examples of the medium and large sized device may be an electric vehicle, a hybrid electric vehicle, a plug-in hybrid electric vehicle, and a power storage system, but the medium and large sized device is not limited thereto.

Hereinafter, the present disclosure will be described in detail, according to specific examples.

Example 1

$NiSO_4$ and $CoSO_4$ were added to distilled water in amounts such that a molar ratio of Ni:Co was 95:5 to prepare a first metal solution with a concentration of 2.4 M. $MnSO_4$ was added to distilled water to separately prepare a second metal solution with a concentration of 2.4 M. Also, a NaOH aqueous solution with a concentration of 8.0 M and a $NH_4OH$ aqueous solution with a concentration of 5.1 M were prepared.

After 13 L of deionized water, 0.013 L of the NaOH aqueous solution, and 0.64 L of the $NH_4OH$ aqueous solution were put into a reactor, dissolved oxygen in the water was removed by purging the reactor with nitrogen gas to create a non-oxidizing atmosphere in the reactor.

Then, a precipitation reaction was performed for 10 minutes at a pH of 11.9 while adding the first metal solution at a rate of 3.8 L/hr, the NaOH aqueous solution at a rate of 2.3 L/hr, and the $NH_4OH$ aqueous solution at a rate of 0.54 L/hr, respectively, to the reactor to form nuclei of nickel-cobalt hydroxide particles. Thereafter, after stirring speed was sequentially reduced and NaOH was added with a pH sensor being involved to adjust a pH of a reaction solution to 11.2 to 11.6, a co-precipitation reaction was performed for 48 hours while adding the first metal solution, the NaOH aqueous solution, and the $NH_4OH$ aqueous solution at rates of 3.8 L/hr, 2.3 L/hr, and 0.54 L/hr, respectively, to prepare nickel-cobalt hydroxide particles.

Thereafter, after the addition of the first metal solution was stopped and NaOH was added with a pH sensor being involved to adjust the pH of the reaction solution to 10.7 to 11.2, a precipitation reaction was performed for 4 hours while the second metal solution, the NaOH aqueous solution, and the $NH_4OH$ aqueous solution were added at rates of 3.8 L/hr, 2.3 L/hr, and 0.54 L/hr, respectively, and stirred to prepare a precursor for a positive electrode active material in which a manganese hydroxide is precipitated on surfaces of the nickel-cobalt hydroxide particles. A molar ratio of Ni:Co:Mn of the entire precursor particle for a positive electrode active material was 88:5:7.

The precursor for a positive electrode active material prepared as described above, $LiOH \cdot H_2O$, and $Al(OH)_3$ were mixed so that a molar ratio of Ni+CO+Mn:Li:Al was 0.98:1.05:0.02, and sintered at 765° C. for 13 hours to prepare a positive electrode active material. A molar ratio of Ni:Co:Mn:Al of the prepared positive electrode active material was 86:5:7:2.

Example 2

$NiSO_4$ was added to distilled water to prepare a first metal solution with a concentration of 2.4 M. $CoSO_4$ was added to distilled water to prepare a second metal solution with a concentration of 2.4 M. $MnSO_4$ was added to distilled water to prepare a third metal solution with a concentration of 2.4 M.

After deionized water was put into a reactor, dissolved oxygen in the water was removed by purging the reactor with nitrogen gas to create a non-oxidizing atmosphere in the reactor. A 8.0 M NaOH solution and a 5.1 M $NH_4OH$ aqueous solution were added to the reactor to prepare a reaction mother liquor with a pH of 12.

Then, the first metal solution, a NaOH aqueous solution, and a $NH_4OH$ aqueous solution were added at rates of 3.8 L/hr, 2.3 L/hr, and 0.54 L/hr, respectively, to perform a precipitation reaction for 42.2 hours. In this case, a pH of a reaction solution was maintained at 11.6.

Thereafter, after the addition of the first metal solution was stopped and the pH of the reaction solution was adjusted to 11.4 by adding NaOH with a pH sensor being involved, the second metal solution, a NaOH aqueous solution, and a $NH_4OH$ aqueous solution were added at rates of 3.8 L/hr, 2.3 L/hr, and 0.54 L/hr, respectively, to perform a precipitation reaction for 2.4 hours.

Then, after the addition of the second metal solution was stopped and the pH of the reaction solution was adjusted to a range of 10.8 to 11.0 by adding NaOH with a pH sensor being involved, the third metal solution, a NaOH aqueous solution, and a $NH_4OH$ aqueous solution were added at rates of 3.8 L/hr, 2.3 L/hr, and 0.54 L/hr, respectively, and a precipitation reaction was performed for 3.4 hours to prepare a precursor for a positive electrode active material. A molar ratio of Ni:Co:Mn of the entire precursor particle for a positive electrode active material was 88:5:7.

The precursor for a positive electrode active material prepared as described above, $LiOH \cdot H_2O$, and $Al(OH)_3$ were mixed so that a molar ratio of Ni+CO+Mn:Li:Al was 0.98:1.05:0.02, and sintered at 765° C. for 13 hours to prepare a positive electrode active material. A molar ratio of Ni:Co:Mn:Al of the prepared positive electrode active material was 86:5:7:2.

Example 3

$NiSO_4$ was added to distilled water to prepare a first metal solution with a concentration of 2.4 M. $MnSO_4$ was added to distilled water to prepare a second metal solution with a concentration of 2.4 M. $CoSO_4$ was added to distilled water to prepare a third metal solution with a concentration of 2.4 M.

After deionized water was put into a reactor, dissolved oxygen in the water was removed by purging the reactor with nitrogen gas to create a non-oxidizing atmosphere in the reactor. A 8.0 M NaOH solution and a 5.1 M $NH_4OH$ aqueous solution were added to the reactor to prepare a reaction mother liquor with a pH of 12.

Then, the first metal solution, a NaOH aqueous solution, and a $NH_4OH$ aqueous solution were added at rates of 3.8 L/hr, 2.3 L/hr, and 0.54 L/hr, respectively, to perform a precipitation reaction for 42.2 hours. In this case, a pH of a reaction solution was maintained at 11.6.

Thereafter, after the addition of the first metal solution was stopped and the pH of the reaction solution was adjusted to 10.8 to 11.0 by adding NaOH with a pH sensor being involved, the second metal solution, a NaOH aqueous solution, and a $NH_4OH$ aqueous solution were added at rates of 3.8 L/hr, 2.3 L/hr, and 0.54 L/hr, respectively, to perform a precipitation reaction for 3.4 hours.

Then, after the addition of the second metal solution was stopped and the pH of the reaction solution was adjusted to 11.4 by adding NaOH with a pH sensor being involved, the third metal solution, a NaOH aqueous solution, and a $NH_4OH$ aqueous solution were added at rates of 3.8 L/hr, 2.3 L/hr, and 0.54 L/hr, respectively, and a precipitation reaction was performed for 2.4 hours to prepare a precursor for a positive electrode active material. A molar ratio of Ni:Co:Mn of the entire precursor particle for a positive electrode active material was 88:5:7.

The precursor for a positive electrode active material prepared as described above, $LiOH \cdot H_2O$, and $Al(OH)_3$ were mixed so that a molar ratio of Ni+CO+Mn:Li:Al was 0.98:1.05:0.02, and sintered at 765° C. for 13 hours to prepare a positive electrode active material. A molar ratio of Ni:Co:Mn:Al of the prepared positive electrode active material was 86:5:7:2.

Comparative Example 1

$NiSO_4$, $CoSO_4$, and $MnSO_4$ were mixed in distilled water in amounts such that a molar ratio of nickel:cobalt:manganese was 88:5:7 to prepare a metal solution with a concentration of 2.4 M.

After deionized water was put into a reactor, dissolved oxygen in the water was removed by purging the reactor with nitrogen gas to create a non-oxidizing atmosphere in the reactor. A 8.0 M NaOH solution and a 5.1 M $NH_4OH$ aqueous solution were added to the reactor to prepare a reaction mother liquor.

Then, while a pH of a reaction solution was maintained at 11.2 to 11.9 by adding the metal solution, a NaOH aqueous solution, and a $NH_4OH$ aqueous solution at rates of 3.8 L/hr, 2.3 L/hr, and 0.54 L/hr, respectively, a co-precipitation reaction was performed for 48 hours to prepare a precursor for a positive electrode active material. A molar ratio of Ni:Co:Mn of the entire precursor particle for a positive electrode active material was 88:5:7.

The precursor for a positive electrode active material prepared as described above, $LiOH \cdot H_2O$, and $Al(OH)_3$ were mixed so that a molar ratio of Ni+CO+Mn:Li:Al was 0.98:1.05:0.02, and sintered at 765° C. for 13 hours to prepare a positive electrode active material. A molar ratio of Ni:Co:Mn:Al of the prepared positive electrode active material was 86:5:7:2.

Experimental Example 1

After coating the positive electrode active materials prepared in Examples 1 to 3 and Comparative Example 1 with carbon or platinum (Pt), thin film samples (thickness of about 100 nm), which may check a cross section of the particle, were prepared by irradiating the sample with an ion beam using a FIB (Focused Ion Beam) instrument (Helios NanoLab 450, FEI). The thin film sample was placed on a grid of a transmission electron microscope (TEM), a high-resolution transmission electron microscope (HR-TEM) image of the thin film sample was obtained using a HR-TEM, and a Gatan software (Digital micrograph) was used to transform the HR-TEM image into a diffraction pattern. Then, after measuring distances between 5 to 10 points in the diffraction pattern, an average value of the distances between these points was obtained, and its reciprocal was calculated as a (003) d-spacing. Measurement results are presented in Table 1 below.

TABLE 1

| (003) d-spacing | Surface (nm) | Inside (nm) |
|---|---|---|
| Example 1 | 0.481 | 0.471 |
| Example 2 | 0.479 | 0.473 |
| Example 3 | 0.488 | 0.478 |
| Comparative Example 1 | 0.476 | 0.476 |

As illustrated in Table 1, with respect to the positive electrode active materials prepared by Examples 1 to 3, a (003) d-spacing of the surface of the particle was 0.005 nm or more larger than a (003) d-spacing inside the particle, but, with respect to the positive electrode active material of Comparative Example 1 prepared by the conventional method, (003) d-spacings of the surface of the particle and inside the particle were at an equivalent level.

Experimental Example 2

Each of the positive electrode active materials prepared by Examples 1 to 3 and Comparative Example 1, a conductive agent (carbon black), and a binder (PVdF) were mixed in a N-methyl-2-pyrrolidone (NMP) solvent in a weight ratio of 97.5:1:1.5 to prepare a positive electrode slurry. One surface of an aluminum current collector was coated with the positive electrode slurry, dried at 130° C., and then rolled to prepare each positive electrode.

Each 2032 coin cell type lithium secondary battery was prepared by preparing an electrode assembly by disposing a separator between each of the positive electrodes prepared as described above and a negative electrode, disposing the electrode assembly in a battery case, and then injecting an electrolyte solution into the battery case.

In this case, a Li metal disk was used as the negative electrode, and, as the electrolyte solution, an electrolyte solution, in which 1 M $LiPF_6$ was dissolved in an organic solvent in which ethylene carbonate:ethyl methyl carbonate: diethyl carbonate were mixed in a volume ratio of 3:3:4, was used.

Each of the lithium secondary batteries prepared as described above was charged at a constant current of 0.1 C to 4.25 V in a constant current/constant voltage (CC/CV) mode (CV 0.05 C) at 25° C. and was then discharged to 3 V in a CC mode to measure initial charge capacity and discharge capacity. Measurement results are presented in Table 2 below.

TABLE 2

| | Charge capacity (mAh/g) | Discharge capacity (mAh/g) |
|---|---|---|
| Example 1 | 235 | 213 |
| Example 2 | 237 | 215 |
| Example 3 | 236 | 214 |
| Comparative Example 1 | 233 | 211 |

Through Table 2, it may be confirmed that the lithium secondary batteries, in which the positive electrode active materials of Examples 1 to 3, in which the (003) d-spacing of the surface of the particle was larger than the (003) d-spacing inside the particle, were used, had better capacity characteristics than the lithium secondary battery in which the positive electrode active material of Comparative Example 1 was used.

Experimental Example 3

After discharging each of the lithium secondary batteries prepared in Experimental Example 2 at discharge currents of 0.33 C, 0.5 C, and 2 C, discharge capacities were measured. Measurement results are presented in Table 3 below.

TABLE 3

| | 0.33 C | 0.5 C | 2.0 C |
|---|---|---|---|
| Example 1 | 203 | 199 | 187 |
| Example 2 | 204 | 200 | 188 |
| Example 3 | 203 | 198 | 187 |
| Comparative Example 1 | 200 | 196 | 183 |

As illustrated in Table 3, it may be confirmed that the lithium secondary batteries, in which the positive electrode active materials of Examples 1 to 3, in which the (003) d-spacing of the surface of the particle was larger than the (003) d-spacing inside the particle, were used, maintained higher capacity during high-rate discharge than the lithium secondary battery in which the positive electrode active material of Comparative Example 1 was used.

The invention claimed is:

1. A positive electrode active material, comprising:

lithium transition metal oxide particles having a lithium transition metal oxide represented by Formula 1, wherein an interplanar spacing of (003) crystal planes ((003) d-spacing) of the lithium transition metal oxide of a surface of the particles is larger than a (003) d-spacing of the lithium transition metal oxide inside the particles, wherein a difference between the (003) d-spacing of the surface of the particles and the (003) d-spacing inside the particles is 0.005 nm or more,

[Formula 1]

$$Li_a[Ni_xCo_yMn_zM^1_w]O_2$$

wherein, in Formula 1, $0.8 \leq a \leq 1.2$, $0.6 \leq x < 1$, $0 < y < 0.4$, $0 < z < 0.4$, and $0 \leq w \leq 0.1$, and $M^1$ is at least one selected from the group consisting of Al, Zr, B, W, Mg, Ce, Hf, Ta, La, Ti, Sr, Ba, F, P, and S.

2. The positive electrode active material of claim 1, wherein the (003) d-spacing of the surface of the particles is in a range of 0.46 nm to 0.50 nm, and the (003) d-spacing inside the particles is in a range of 0.45 nm to 0.50 nm.

3. The positive electrode active material of claim 1, wherein $0.8 \leq x < 1$, $0 < y < 0.2$, and $0 < z < 0.2$.

4. A method of preparing the positive electrode active material of claim 1, the method comprising:

preparing a multilayer-structured precursor for a positive electrode active material in which two or more of nickel, cobalt, and manganese are precipitated in different regions; and mixing the multilayer-structured precursor with a lithium raw material and sintering the mixture.

5. The method of claim 4, wherein the preparing of the multilayer-structured precursor comprises:

performing a co-precipitation reaction while adding a nickel-cobalt metal solution, an ammonium cationic complexing agent, and a basic compound to form nickel-cobalt hydroxide particles in which nickel and cobalt are co-precipitated; and performing a precipitation reaction while adding a manganese metal solution, an ammonium cationic complexing agent, and a basic compound to a reaction solution containing the nickel-cobalt hydroxide particles to precipitate a manganese hydroxide on the nickel-cobalt hydroxide particles.

6. The method of claim 4, wherein the preparing of the multilayer-structured precursor comprises:

performing a precipitation reaction while adding a nickel metal solution, an ammonium cationic complexing agent, and a basic compound to form a nickel hydroxide;

performing a precipitation reaction while adding a cobalt metal solution, an ammonium cationic complexing agent, and a basic compound to a reaction solution containing the nickel hydroxide to form a nickel-cobalt hydroxide in which a cobalt hydroxide is precipitated on the nickel hydroxide; and performing a precipitation reaction while adding a manganese metal solution, an ammonium cationic complexing agent, and a basic compound to a reaction solution containing the nickel-cobalt hydroxide to form nickel-cobalt-manganese hydroxide particles in which the nickel hydroxide, the cobalt hydroxide, and a manganese hydroxide are sequentially precipitated.

7. The method of claim 4, wherein the preparing of the multilayered-structured precursor comprises:

performing a precipitation reaction while adding a nickel metal solution, an ammonium cationic complexing agent, and a basic compound to form a nickel hydroxide;

performing a precipitation reaction while adding a manganese metal solution, an ammonium cationic complexing agent, and a basic compound to a reaction solution containing the nickel hydroxide to form a nickel-manganese hydroxide in which a manganese hydroxide is precipitated on the nickel hydroxide; and performing a precipitation reaction while adding a cobalt metal solution, an ammonium cationic complexing agent, and a basic compound to a reaction solution containing the nickel-manganese hydroxide to form nickel-manganese-cobalt hydroxide particles in which the nickel hydroxide, the manganese hydroxide, and a cobalt hydroxide are sequentially precipitated.

8. A positive electrode comprising the positive electrode active material of claim 1.

9. A lithium secondary battery comprising the positive electrode of claim 8.

* * * * *